United States Patent
Yoshimuta

(10) Patent No.: US 9,154,066 B2
(45) Date of Patent: Oct. 6, 2015

(54) DRIVE CONTROL APPARATUS AND DRIVE CONTROL METHOD

(71) Applicant: CANON KABUSHIKI KAISHA, Tokyo (JP)

(72) Inventor: Junki Yoshimuta, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/302,302

(22) Filed: Jun. 11, 2014

(65) Prior Publication Data

US 2014/0368676 A1 Dec. 18, 2014

(30) Foreign Application Priority Data

Jun. 14, 2013 (JP) .................................. 2013-125727

(51) Int. Cl.
*H02P 8/22* (2006.01)
*H04N 5/232* (2006.01)

(52) U.S. Cl.
CPC . *H02P 8/22* (2013.01); *H04N 5/232* (2013.01)

(58) Field of Classification Search
CPC ............. H02P 8/22; H02P 8/00; H04N 5/232; G05B 2219/41339; G05B 19/40
USPC ..................... 348/345; 396/256, 260; 318/685
See application file for complete search history.

(56) References Cited

U.S. PATENT DOCUMENTS

| 5,914,580 A * | 6/1999 | Senoh ........................... 318/696 |
| 6,555,985 B1 * | 4/2003 | Kawabata et al. ............ 318/685 |
| 2006/0108964 A1 * | 5/2006 | Shibatani ...................... 318/685 |
| 2006/0193626 A1 * | 8/2006 | Kim et al. ..................... 396/427 |

FOREIGN PATENT DOCUMENTS

| JP | 62-92797 A | 4/1987 |
| JP | 2-136100 A | 5/1990 |
| JP | 4165915 B2 | 10/2008 |

* cited by examiner

*Primary Examiner* — Nhan T Tran
(74) *Attorney, Agent, or Firm* — Canon U.S.A., Inc. IP Division

(57) ABSTRACT

A drive control apparatus includes a stepping motor, a position detection unit configured to detect a rotational position of a rotor of the stepping motor, a feedback drive unit configured to drive the stepping motor by a feedback control based on an output from the position detection unit, an open loop drive unit configured to drive the stepping motor by an open loop control, and a switching unit configured to switch the driving of the stepping motor between the driving of the stepping motor by the feedback control and the driving of the stepping motor by the open loop control, wherein the feedback drive unit and the open loop drive unit are both configured to drive the stepping motor by microstep driving.

9 Claims, 10 Drawing Sheets

$f_{opN}$: MICROSTEP DIVISION RATIO SWITCH FREQUENCY
(OPEN LOOP CONTROL)

$f_{fbN}$: MICROSTEP DIVISION RATIO SWITCHING FREQUENCY
(FEEDBACK CONTROL)

DRIVE CONTROL APPARATUS AND DRIVE CONTROL METHOD

BACKGROUND OF THE INVENTION

1. Field of the Invention

The present invention relates to a drive control apparatus and a drive control method, and more particularly, to a technique of driving a stepping motor by a microstep driving method.

2. Description of the Related Art

It is possible to control the stepping motor to rotate in steps of particular angles by switching currents passed through coils. Therefore, it is possible to control a position without using a position sensor. Therefore, an open loop control is widely used as a method of controlling the stepping motor. In the open loop control, states of coils in terms of currents flowing through the coils are switched at particular time intervals. However, in a case where the motor is driven at a high speed or in a case where an abrupt change occurs in load on the motor, there is a possibility that it becomes impossible for a rotor to follow the switching in the currents flowing through the coils, which may cause step-out to occur. To handle the above situation, it is known to configure the stepping motor to have a position detection sensor to detect the rotational position of the rotor, and control the stepping motor by a feedback control such that when the speed is increased or decreased, the currents flowing through the coils are switched according to an output from the position detection sensor.

Japanese Patent No. 4165915 discloses a stepping motor that is controlled such that the open loop control is used to drive the motor in a particular period after the driving of the motor is started and in a particular period before the motor is stopped, while the feedback control is used in the other period. This technique allows it to drive the motor at a high speed, and furthermore it is possible to precisely control the motor when the motor is stopped.

However, in a drive control apparatus disclosed in Japanese Patent No. 4165915, an excitation method used to drive the motor by the open loop control is different from an excitation method used to drive the motor by the feedback control. In the open loop control, the motor is driven using microstep driving such that phases of driving currents that are passed through the coils for excitement are changed in steps of small amounts thereby obtaining a sinusoidal-waveform applied voltage. On the other hand, in the feedback control, the motor is driven by applying a rectangular-waveform voltage.

The difference in the excitation method restricts the timing of switching the control from the open loop control to the feedback control, because the units of change in driving current are switched from microsteps to large steps at the transition of the control and this may lead to instability in driving the motor unless the control is switched with correct timing. Thus, to assure the stability in driving the motor, the control is switched after waiting for the correct timing.

The restriction on the timing of switching the control may result in a possibility that the timing of switching the control from the open loop control to the feedback control is delayed from intended timing. The delay in the timing of switching the control may result in an increase in time necessary to reach a target driving position.

SUMMARY OF THE INVENTION

A drive control apparatus according to an embodiment includes a position detection unit configured to detect a rotational position of a rotor of a stepping motor, a feedback drive unit configured to drive the stepping motor by a feedback control based on an output from the position detection unit, an open loop drive unit configured to drive the stepping motor by an open loop control, and a switching unit configured to switch the driving of the stepping motor between the driving of the stepping motor by the feedback control and the driving of the stepping motor by the open loop control, wherein the switching unit is capable of switching the driving of the stepping motor between the driving of the stepping motor by the feedback control and the driving of the stepping motor by the open loop control, wherein the feedback drive unit and the open loop drive unit are both configured to drive the stepping motor by microstep driving, wherein the open loop drive unit controls the driving of the stepping motor such that as a driving frequency of the rotor increases, a microstep division ratio of the microstep driving decreases, and wherein the feedback drive unit sets the division ratio of the microstep independently of the open loop drive unit.

An embodiment provides a method of controlling driving of a stepping motor by selecting either one of an open loop control and a feedback control, wherein the driving of the stepping motor is controlled by microstep driving in both the open loop control and the feedback control, wherein in the open loop control, the driving of the stepping motor is controlled such that the microstep division ratio in the microstep driving decreases as the driving frequency of the rotor of the stepping motor increases, and wherein in the feedback control the microstep division ratio is set independently of the open loop control.

Further features of the present invention will become apparent from the following description of exemplary embodiments with reference to the attached drawings.

DESCRIPTION OF THE EMBODIMENTS

The present invention is described in detail below with reference to embodiments in conjunction with drawings.

First Embodiment

Figure 1:
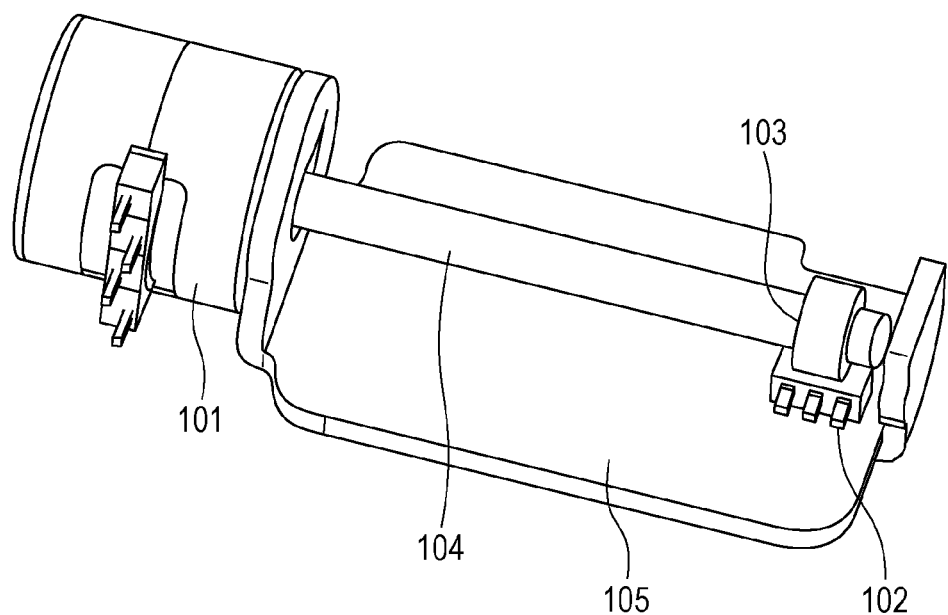
FIG. 1 is an external perspective view of a motor unit including a stepping motor according to a first embodiment.
Figure 2:
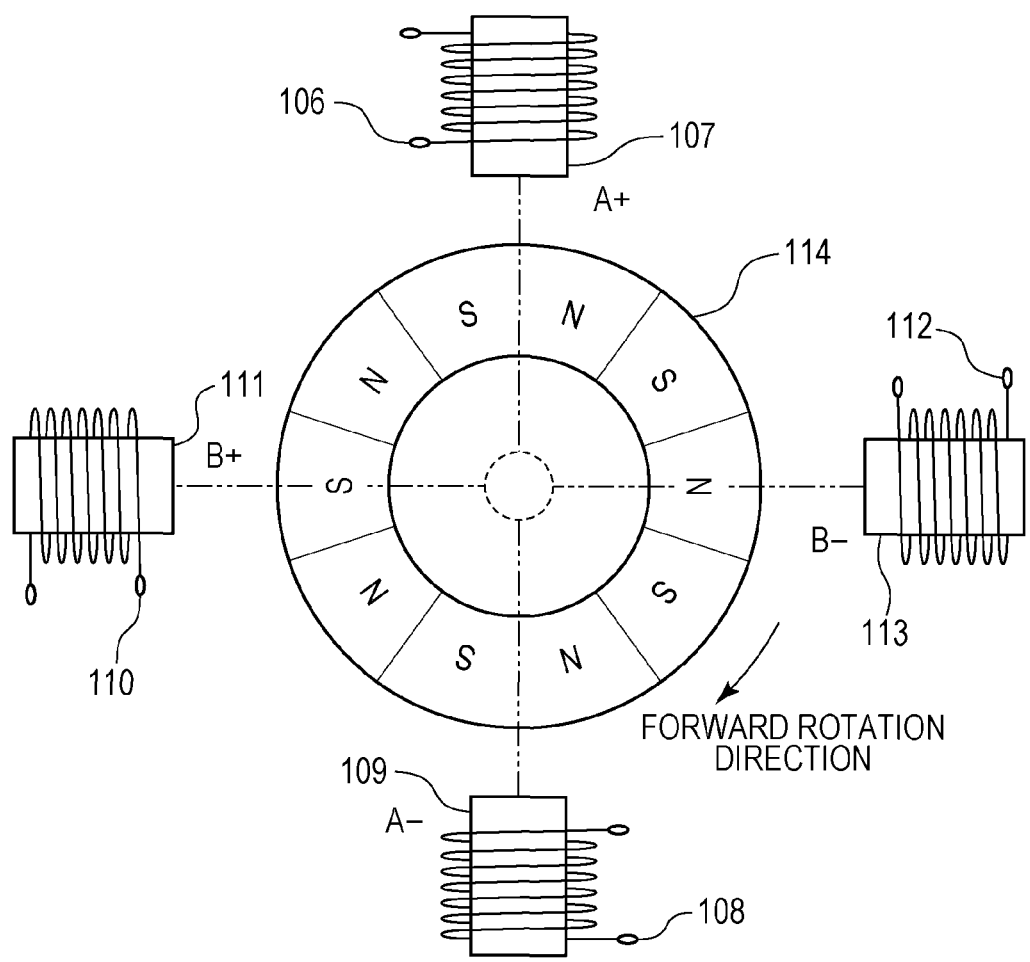
FIG. 2 is a diagram illustrating stators and a rotor forming a stepping motor according to the first embodiment.

FIG. 1 is an external perspective view of a stepping motor unit 100 including a stepping motor 101 according to a first embodiment. FIG. 2 is a diagram illustrating a relationship among stators 107, 109, 111, and 113 and a rotor 114 in the stepping motor 101. The stepping motor unit 100 includes the stepping motor 101, an encoder (position detection unit) 102 configured to detect a rotational position of the rotor 114, an encoder magnet 103, a rotor shaft 104, and an encoder holder 105. The stepping motor 101 according to the present embodiment includes an A+ phase stator 107, an A− phase stator 109 a B+ phase stator 111, a B− phase stator 113, and the rotor 114, wherein each stator has its own exciting coil.

The rotor 114 is fixed with a magnet, which is a cylindrical-shaped permanent magnet whose circumferential side surface is magnetized so as to have ten poles that provide a magnetized pattern in which the magnetic force varies sinusoidally with the angular position. When the A+ phase stator 107, the A− phase stator 109, the B+ phase stator 111, and the B− phase stator 113 are excited by passing currents through the respective phase exciting coils of the stepping motor 101, the rotor 114 rotates in response thereto. The encoder magnet 103 is, as with the rotor 114, a cylindrical-shaped permanent magnet having ten magnetized poles around its circumferential side face. In the present embodiment, the encoder magnet 103 is configured, by way of example, in a similar manner to the rotor 114, but the number of poles may be different between the encoder magnet 103 and the rotor 114.

The encoder 102 is fixed on the encoder holder 105, and the encoder 102 detects, at regular intervals, a change in magnetic flux density caused by the rotation of the encoder magnet 103 and generates an output signal according to a detection result. As the rotor 114 rotates, the rotor shaft 104 rotates together with the rotor 114, and the encoder magnet 103 fixed on the rotor shaft 104 also rotates in synchronization with the rotor 114. In the present embodiment, a Hall IC is used as the encoder 102. Two types of alternating detection signals are obtained from the single Hall IC, and a binary output signal is output. Although the Hall IC is used as the encoder to output a digital signal in the present embodiment, another type of an encoder such as a photointerrupter or the like configured to output an analog signal may be used.

Figure 3:
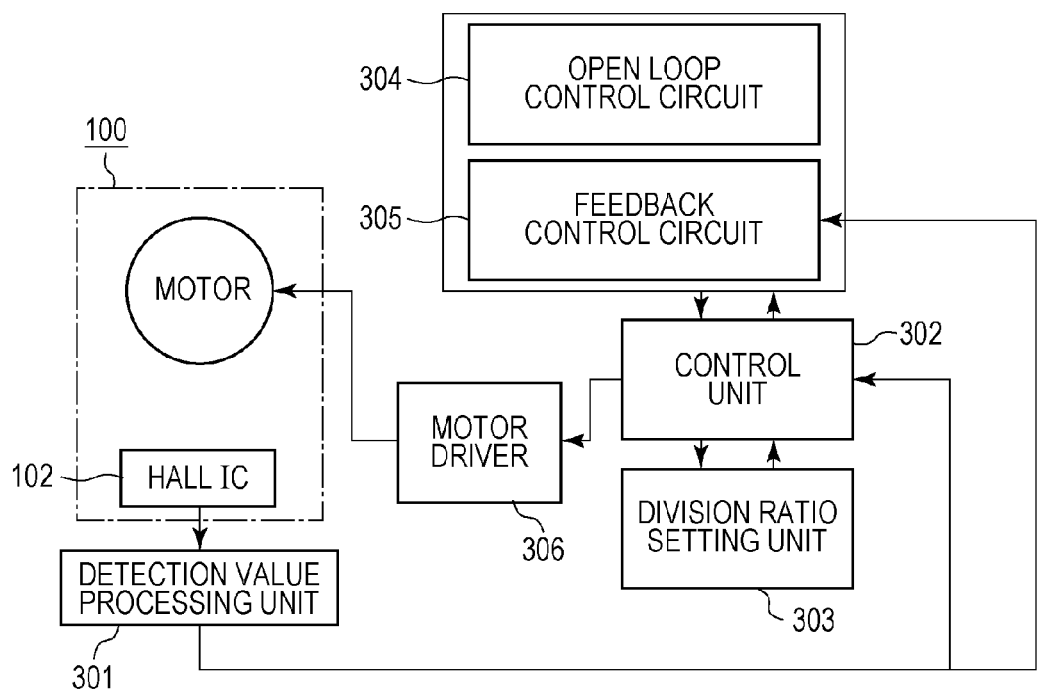
FIG. 3 is a block diagram of a drive control apparatus of a stepping motor according to the first embodiment.

Next, referring to FIG. 3, a drive control apparatus according to the present embodiment is described in detail below. The signal indicating the detected rotational position of the rotor 114 is output from the encoder 102 and input to a detection value processing unit 301. In the detection value processing unit 301, a rotation state (angular speed, angular acceleration, rotation direction, and the like) of the stepping motor 101 is calculated from the output signal supplied from the encoder 102. In a case where the output signal from the encoder 102 is in an analog form, the analog output signal is converted into a digital signal by an analog-to-digital converter (not illustrated) and the resultant digital signal is input to the detection value processing unit 301.

Drive command values (drive amount, drive direction, drive speed, control mode, and the like) given by the detection value processing unit 301 and a higher-level controller (not illustrated) are input to a control unit 302, and processing commands are given to the respective constituent elements of the drive control apparatus via the control unit 302. The control unit 302 determines the control mode of the stepping motor 101 based on the drive command values and a feedback signal of the stepping motor 101 supplied from the detection value processing unit 301. Based on the control mode determined by the control unit 302, the driving of the motor is controlled by an open loop control circuit (open loop driving unit) 304 or a feedback control circuit (feedback driving unit) 305. The open loop control circuit 304 or the feedback control circuit 305 calculates the optimum driving speed depending on the driving state of the motor. A division ratio setting unit 303 determines a microstep division ratio based on information possessed by the control unit 302 in terms of the driving speed and the like. A motor driver 306 generates a driving signal based on a processing command given by the control unit 302 thereby driving the stepping motor 101.

The controlling of the driving of the motor by the detection value processing unit 301, the control unit 302, the division ratio setting unit 303, the open loop control circuit 304, and the feedback control circuit 305 may also be performed by executing the following process. That is, software (a program) for realizing the functions associated with the controlling of the driving of the motor may be supplied to a system or an apparatus via a network or a storage medium, and a computer (or a CPU, an MPU, or the like) of the system or the apparatus may read the program and execute it.

Next, the open loop control and the feedback control are described in further detail below. The open loop control is a method of controlling the driving of the motor by switching currents supplied to coils at time intervals that are set in advance depending on the driving speed.

In the open loop control, currents passed through the respective phase exciting coils 106, 108, 110, and 112 are sequentially switched so as to generate a rotating magnetic field in a drive direction specified by the drive command value. The rotor 114 rotates following the rotating magnetic field. When the rotor 114 starts to move from a rest state, a large torque occurs temporarily due to a static friction, which may cause overshooting to occur. In the open loop control, there is no mechanism of suppressing the excessive rotation, which may cause instability to occur in the operation in a particular period such as a starting period. In a case where a received drive command specifies quick acceleration or deceleration, there is a possibility that the rotor 114 is not capable of rotating following the switching of the coil excitement, which may cause the rotor 114 to step out. In the open loop control, although a situation related to the dynamic characteristics such as that described above may occur when quick acceleration or deceleration is performed, but the open loop control is advantageous in that when the rotation of the rotor 114 is stopped, there is a small phase difference between the coil driving current and the magnetic field of rotor 114, and thus a high-precision control is achieved in the stopping process.

In the feedback control, a change in magnetic flux of the encoder magnet 103 is detected by the encoder 102, and the currents passed through the coils of the stepping motor 101 are switched according to the output from the encoder 102. By controlling the driving currents, it is possible to obtain a maximum torque available by the driving currents. Furthermore, there is a mechanism of preventing an excessive rotation to occur, and thus it is possible to suppress the overshooting, which makes it possible to achieve good dynamic characteristics.

However, there is a possibility that a torque ripple occurring in the stepping motor 101 or noise included in a sensor affects the stability of the driving system, and thus there is a possibility that sufficiently high static performance is not obtained. That is, when the rotation of the rotor 114 is stopped, the phase difference between the coil driving current and the rotating magnetic field of the rotor 114 becomes small, and thus noise such as the torque ripple or the like in the feedback information becomes relatively great. This may cause the rotation of the rotor 114 to be disturbed, which may cause a vibration or noise to occur in the motor. Thus the precision of stopping the rotor 114 is low compared with the open loop control.

As may be seen from the above discussion, it may be desirable to use the open loop control in controlling the driving of the motor when the rotor 114 is driven at a low speed or when the rotor 114 is stopped in a precise manner. On the other hand, when the rotor 114 is driven at a high speed, it may be desirable to control the driving of the motor by the feedback control.

Next, a description is given below as to switching of exciting between the driving of the motor by the open loop control and the driving of the motor by the feedback control.

First, the phase exciting coils of the stepping motor 101 are excited by passing currents through them thereby magnetizing the A+ phase stator 107, the A− phase stator 109, the B+ phase stator 111, and the B− phase stator 113. By periodically switching the excited phases, it is possible to rotate the rotor 114 in an arbitrary direction. There is an electrical phase difference of 180° between the A+ phase stator 107 and the A− phase stator 109, and there is an electrical phase difference of 180° also between the B+ phase stator 111 and the B− phase stator 113. Furthermore, there is an electrical phase difference of 90° between the A+ phase stator 107 and the B+ phase stator 111, and there is an electrical phase difference of 90° between the A− phase stator 109 and the B− phase stator 113.

Figure 4:
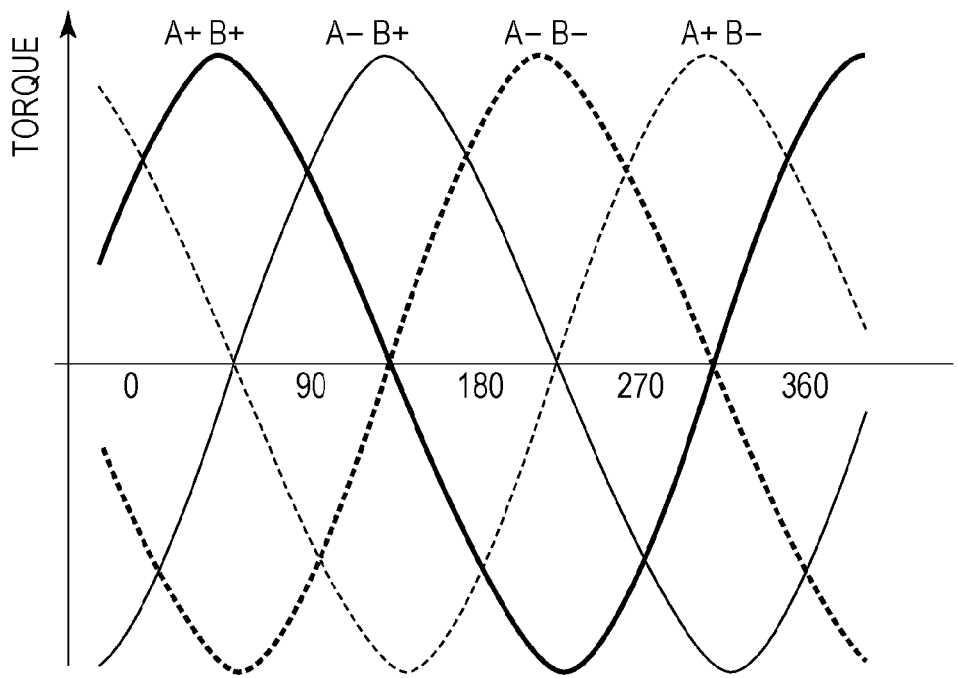
FIG. 4 is a diagram conceptually illustrating a waveform of a torque applied to a rotor for each exciting condition.

FIG. 4 is a diagram illustrating a change in torque in a forward rotation direction applied to the rotor 114 when sinusoidal currents are passed through the coils. The horizontal axis represents the magnetic phase of the rotor 114, and the vertical axis represents the torque applied to the rotor 114. In FIG. 4, four waveforms each represent a torque obtained as a result of a total effect of exciting phases. A waveform labelled A+B+ represents a torque waveform obtained when the A+ phase stator 107 and the B+ phase stator 111 are excited. A waveform labelled A−B+ represents a torque waveform obtained when the A− phase stator 109 and the B+ phase stator 111 are excited. A waveform labelled A+B− represents a torque waveform obtained when the A+ phase stator 107 and the B− phase stator 113 are excited. A waveform labelled A−B− represents a torque waveform obtained when the A− phase stator 109 and the B− phase stator 113 are excited. Note that in the torque waveforms illustrated in FIG. 4, a reduction caused by a back electromotive force or the like that occurs in the coils is not taken into account.

Figure 5:
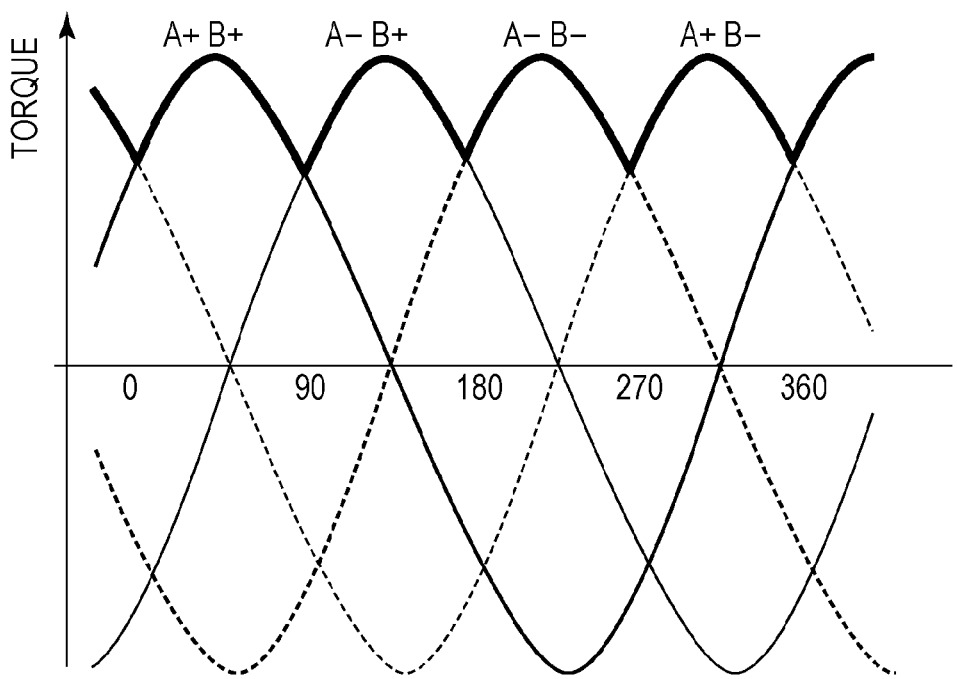
FIG. 5 is a diagram illustrating a manner in which exciting is switched so as to efficiently generate a torque.

The switching of the excited phase is performed such that the four waveforms illustrated in FIG. 4 are switched according to the change in phase. To obtain a torque in a highly efficient manner, as illustrated in FIG. 5, the exciting is switched to the A+B+ waveform at a phase angle of 0°, to the A−B+ waveform at 90°, to the A−B− waveform at 180°, and to the A+B− waveform at 270°. By controlling the timing of switching the excited phase using the feedback control, it is possible to achieve a high efficiency in generating the torque.

Figure 6:
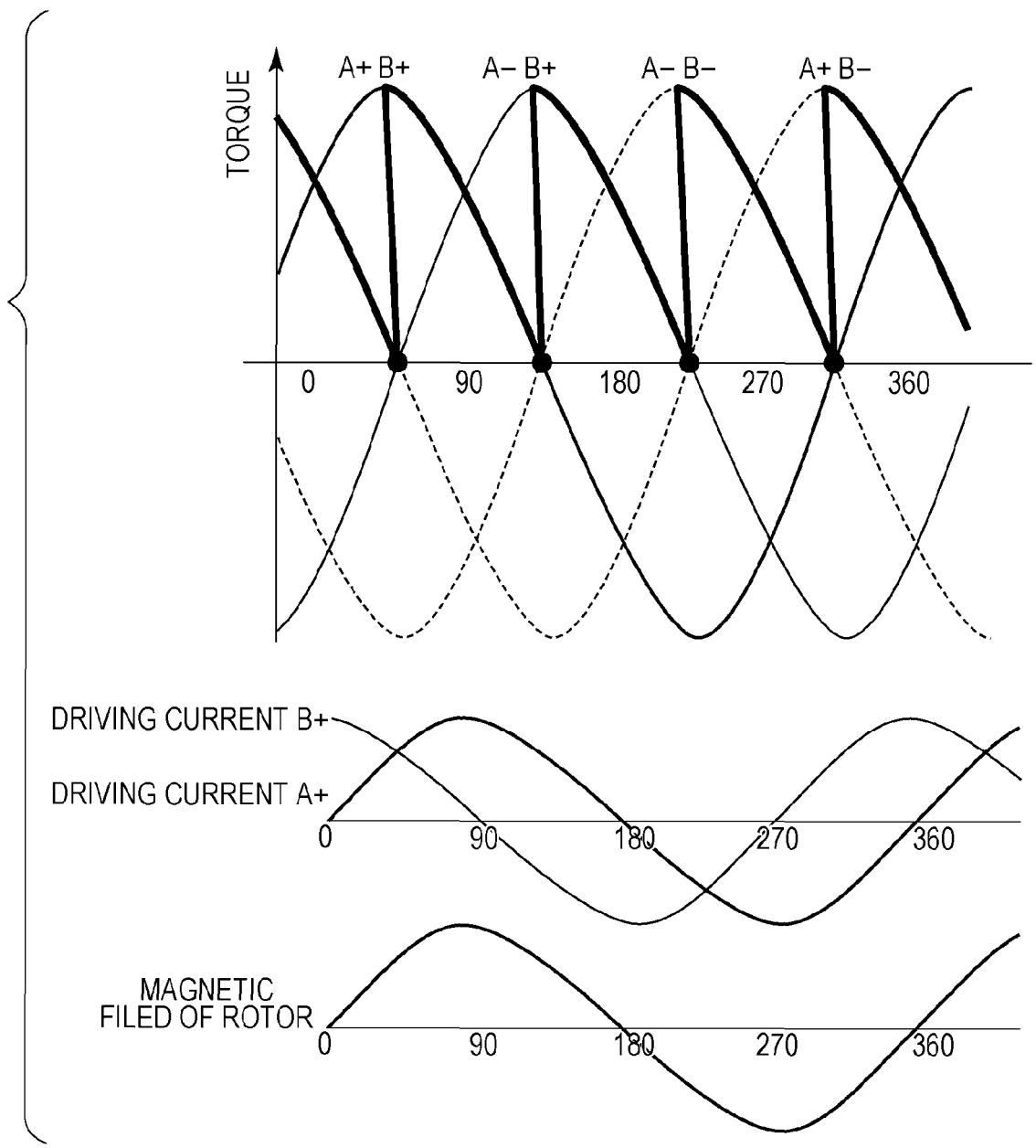
FIG. 6 is a diagram illustrating a manner in which exciting is switched in a case where a stepping motor is driven at a low speed in an open loop control.
Figure 7:
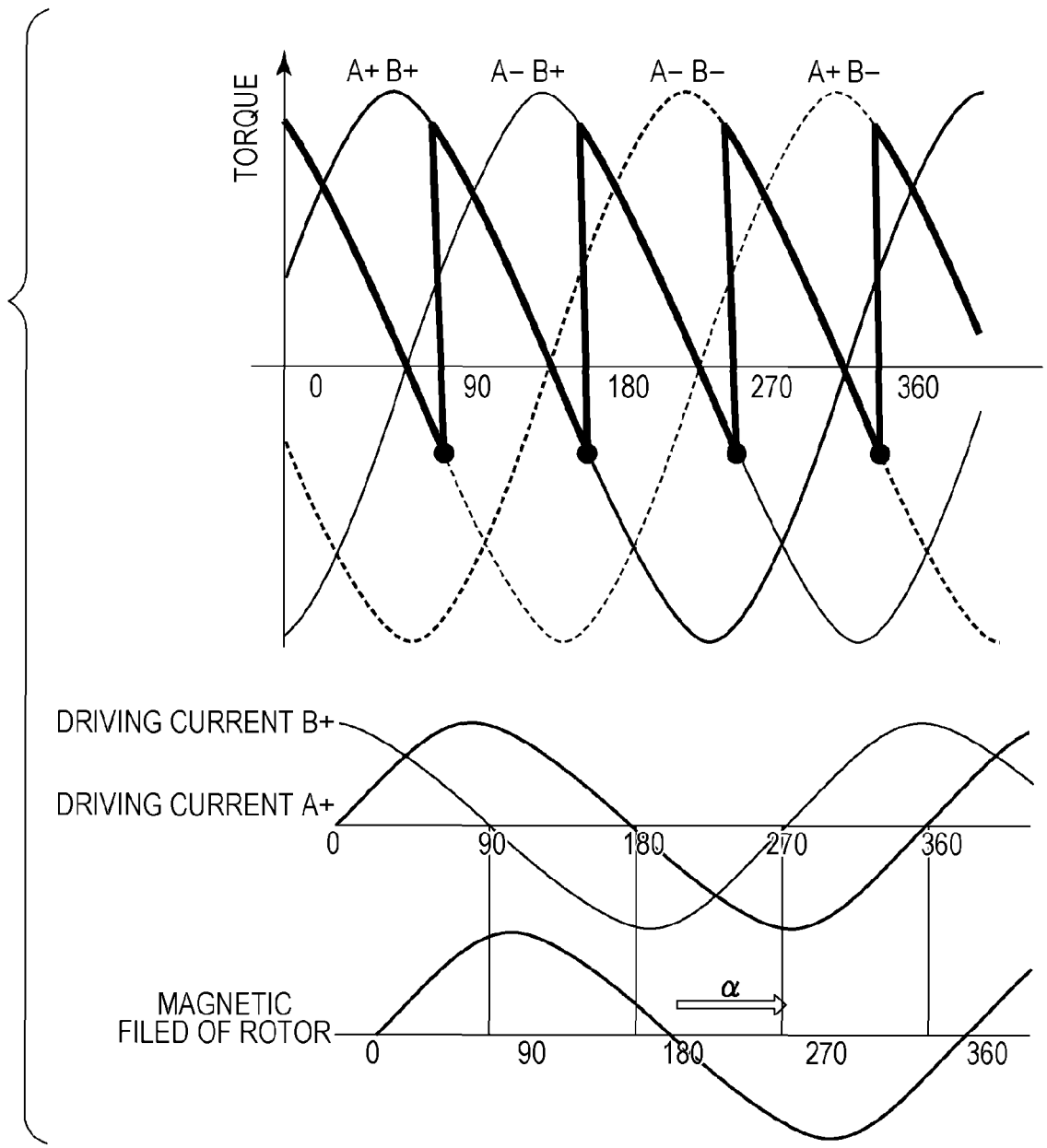
FIG. 7 is a diagram illustrating a manner in which exciting is switched in a case where a stepping motor is driven at a middle speed in an open loop control.

On the other hand, in the case of the open loop control, the excited phase is switched at the predetermined time intervals, and thus it is difficult to achieve a high efficiency in generating the torque. FIG. 6 and FIG. 7 illustrate examples of torque waveforms obtained in the open loop control. FIG. 6 illustrates an example of a torque waveform obtained when the rotor 114 is driven at a low speed, while FIG. 7 illustrates an example of a torque waveform obtained when the rotor 114 is driven at a middle speed. In FIG. 6, an upper part illustrates a relationship between the magnetic phase and the waveform of the torque generated in the rotor 114. A middle part illustrates a relationship between the magnetic phase and the driving currents of the A+ phase stator 107 and the B+ phase stator 111. A lower part illustrates a relationship between the magnetic phase and the rotating magnetic field of the rotor magnet at an arbitrary observing point.

As may be seen from FIG. 6, in the low-speed driving operation, the rotation of the rotor 114 has substantially no delay with reference to the change in magnetic phase of the exciting coil, and thus there is substantially no difference in phase between the coil driving current and the rotating magnetic field of the rotor 114. When the driving state of the rotor 114 becomes stable, the excited phase is switched.

In this state, if the driving speed of the rotor 114 is increased, it becomes difficult for the rotor 114 to rotate precisely following the driving current of the coil, and thus the phase difference between the coil driving current and the rotating magnetic field of the rotor 114 increases. As a result, as illustrated in FIG. 7, a delay occurs in the timing of switching the excited phase compared with the low-speed driving operation. As a result, a torque in the reverse rotation direction is generated. When the driving speed is further increased to perform a high-speed driving operation, the torque in the forward rotation direction decreases and the torque in the reverse rotation direction increases, which results in an increase in the possibility that a step-out occurs.

Next, a phase advance control, which is used as one of techniques by the feedback control, is described below. In the phase advance control, the phase difference between the coil driving current and the rotating magnetic field of the rotor 114 is controlled so as to properly adjust phase angle such that the rotor 114 is allowed to rotate at a high speed without having step-out. The timing of switching the excited phase of the stepping motor 101 is controlled based on the rotation angle of the rotor 114 detected by the encoder 102. In FIG. 7, an arrow {a} represents the phase differences in the present embodiment. The phase differences represented by the arrow {a} is from a zero crossing point of the waveform of the rotating magnetic field of the rotor 114 to a next zero crossing point of the waveform of the driving current. It is possible to adjust the phase differences by controlling the frequency of the driving current flowing through the coils thereby making it possible to stably drive the stepping motor 101 without having step-out. Furthermore, it is possible to drive the stepping motor 101 at a high speed by controlling the driving current of the coils such that the phase differences {a} becomes small and the phase angle is advanced. In the present embodiment, the phase advance control is performed using the feedback control. However, the present embodiment is not limited to this. For example, PID control, control using a Kalman filter, or other feedback control techniques may be employed.

Next, the microstep driving and the dividing of the microstep are further described below. The microstep driving refers to a method of driving a stepping motor such that the phase of the driving current flowing through the coils for excitement is changed by a small amount at a time, thereby driving the stepping motor with a step angle smaller than the inherent step angle of the stepping motor 101. Use of the microstep driving scheme allows a reduction in vibration of the motor. In particular, when the motor is driven at a low speed, the microstep driving scheme provides a significant effect of the reduction in the vibration. This is because when the motor is driven at a low speed, if the step angle of the stepping motor is set to be large, the driving is performed intermittently, which results in an increase in the vibration of the motor. On the other hand, when the step angle is set to be small, it becomes necessary to drive the motor at a higher clock frequency, and thus high-speed information processing is necessary in a control system including the control unit 302, the open loop control circuit 304, the feedback control circuit 305, and the like.

In the present embodiment, the microstep driving scheme is employed in both the open loop control and the feedback control, which eases the restriction on the timing of switching the control. Therefore, it is possible to minimize the delay in the switching of the control between the open loop control and the feedback control. Thus it is possible to driving a to-be-driven object at a higher driving speed, and it is possible to quickly switch the control to the feedback control, which allows the to-be-driven object to quickly reach a target driving position.

The method of switching the step division ratio depending only on the motor driving speed works well in the open loop control in which it is allowed to actively control the driving speed. However, there is a possibility that this method may not work well in the feedback control in which the driving speed is controlled passively according to a feedback signal.

In view of the above, in the present embodiment, the microstep division ratio in the open loop control and the microstep division ratio in the feedback control are independently set to values so as to be optimum for the respective control methods.

Figure 8:
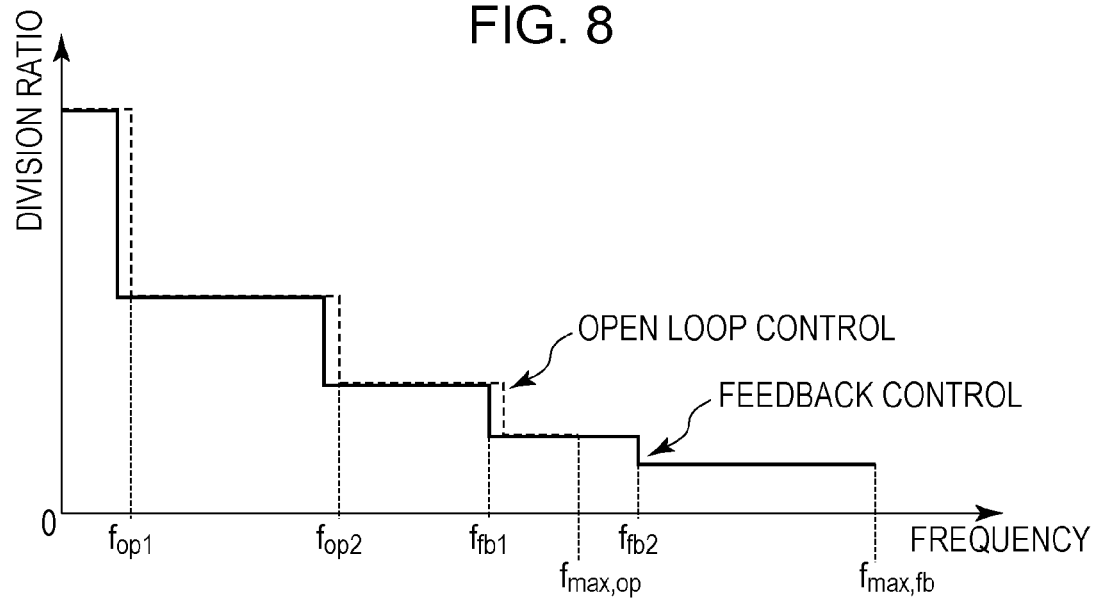
FIG. 8 is a diagram illustrating a relationship between a driving frequency of a stepping motor and a microstep division ratio in an open loop control and a feedback control.

FIG. 8 illustrates an example of a manner in which the microstep division ratio is set according to the present embodiment. In FIG. 8, a relationship is illustrated between the driving frequency of the stepping motor 101 and the microstep division ratio. In FIG. 8, a broken line represents a change in the microstep division ratio in the open loop control, and a solid line represents a change in the microstep division ratio in the feedback control. As for the setting of the microstep division ratio, the open loop driving unit and the feedback driving unit performs the setting independently.

In either control scheme, the microstep division ratio is set depending on the driving frequency. More specifically, in the present embodiment, the division ratio (the number of divisions) is reduced as the driving frequency increases. The microstep division ratio is allowed to take discrete values, and the division ratio is determined according to predetermined threshold values of driving frequencies. Taking discrete values means that the division ratio changes in a stepwise manner at particular driving frequencies. For example, allowable division ratios are stored in advance in the form of table data, and the division ratio is changed at each of predetermined driving frequencies. For example, the division ratio is discretely changed to values such as 512, 256, 128, 64, . . . , and so on.

On a horizontal axis, $f_{max,\,op}$ indicates a maximum driving frequency in the open loop control. In the open loop control, driving frequencies higher than $f_{max,\,op}$ are not used in the driving of the stepping motor 101. On the other hand, $f_{max,\,fb}$ represents a maximum driving frequency in the feedback control. There is a difference in time necessary for the operation between the open loop control and the feedback control. As a result, driving frequencies at which the microstep division ratio is switched are different between the open loop control and the feedback control. In the present embodiment, the operation time in the feedback control is greater than that in the open loop control, and thus, in the feedback control, the microstep division ratio is switched at lower driving frequencies than in the open loop control.

Figure 9:
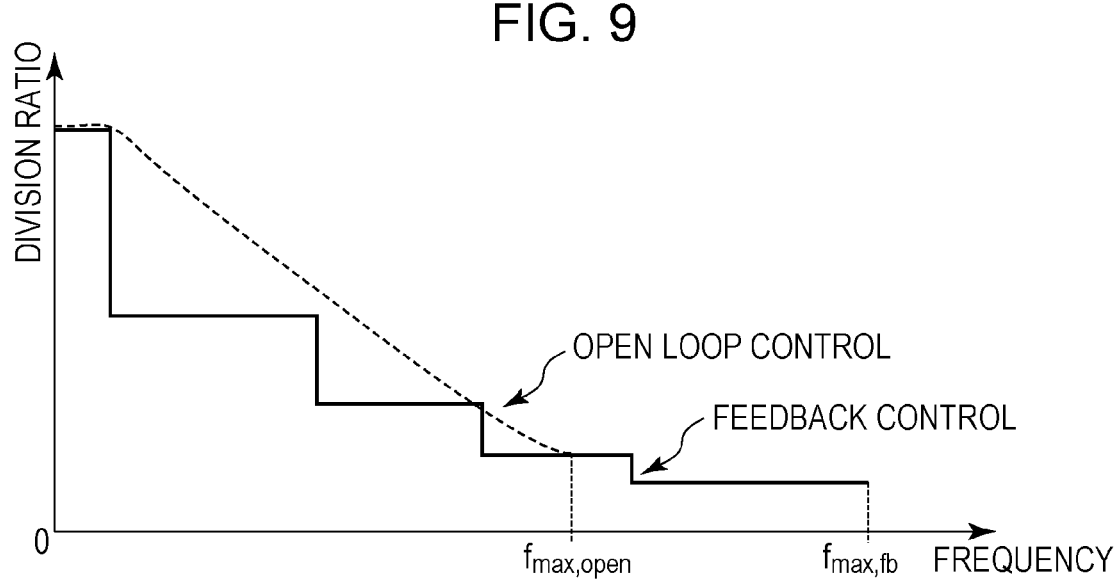
FIG. 9 is a diagram illustrating a relationship between a driving frequency of a stepping motor and a microstep division ratio in a case where the division ratio is changed in a stepwise manner in an open loop control.
Figure 10:
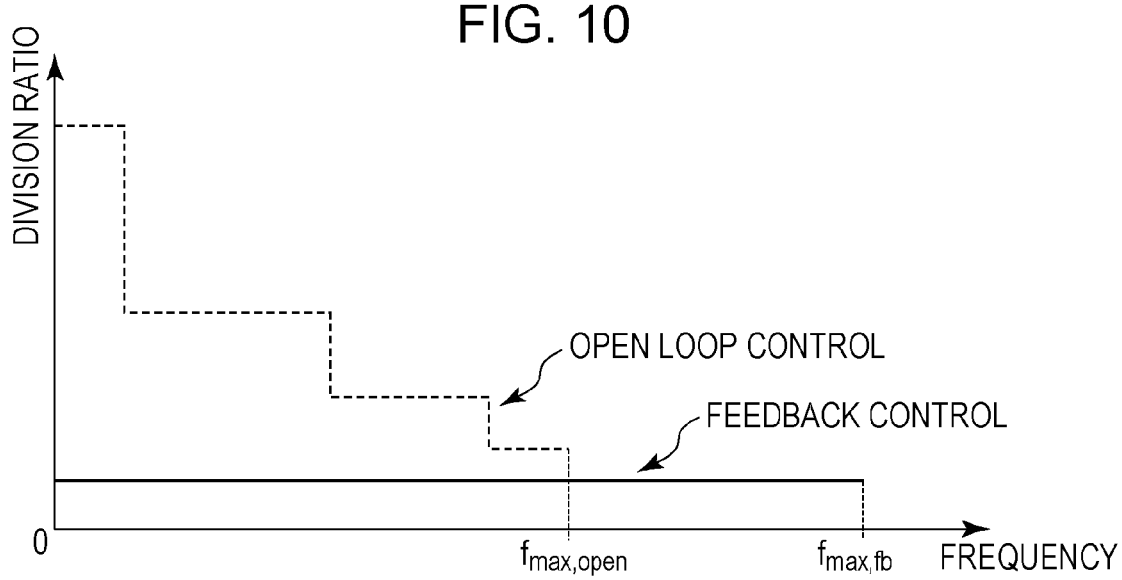
FIG. 10 is a diagram illustrating a relationship between a driving frequency of a stepping motor and a microstep division ratio in a case where the division ratio is maintained constant in a feedback control.

FIG. 9 and FIG. 10 illustrate examples of manners, different from that illustrated in FIG. 8, in which the microstep division ratio is set. FIG. 9 illustrates a relationship between the driving frequency and the microstep division ratio in a case where the division ratio is changed in a stepwise manner in the open loop control mode. In the open loop control mode, no fluctuation occurs in the driving frequency, and thus it is allowed to stepwisely change the microstep division ratio with the driving frequency. However, it may be desirable not to change the division ratio in a range close to a resonance frequency of the stepping motor 101. Note that when the division ratio is changed stepwisely with the driving frequency, the amount of change at a time may be small. For example, the division ratio may be changed to values such as 512, 511, 510, . . . and so on.

At a driving frequency at which the control mode is switched from the open loop control mode to the feedback control mode, it may be desirable that the microstep division ratio is maintained at the transition between the two control modes. That is, when the control mode is switched to the feedback control mode, the feedback control is started with the microstep division ratio equal to the value employed in the open loop control mode immediately before the transition of the mode. Furthermore, immediately after the transition to the feedback control mode, it may be desirable to maintain the microstep division ratio for a predetermined period to achieve stability in controlling the motor.

FIG. 10 illustrates a relationship between the driving frequency and the microstep division ratio in a case where the microstep division ratio is maintained constant in the feedback control mode. The microstep division ratio is determined for the maximum driving frequency $f_{max,\,fb}$ in the feedback control mode, and the determined value is used over the whole driving frequency range. As a result, the division ratio is relatively small in a low driving frequency range compared with those in FIG. 8 and FIG. 9. In FIG. 10, the microstep division ratio is set to a value that allows the stepping motor 101 to have substantially no vibration or noise which may otherwise occur due to a large division ratio. By maintaining the microstep division ratio at a constant value as described above, it is possible to reduce the amount of information necessary in driving the stepping motor 101, and thus it is possible to reduce the processing load on a CPU or the like.

Figure 11:
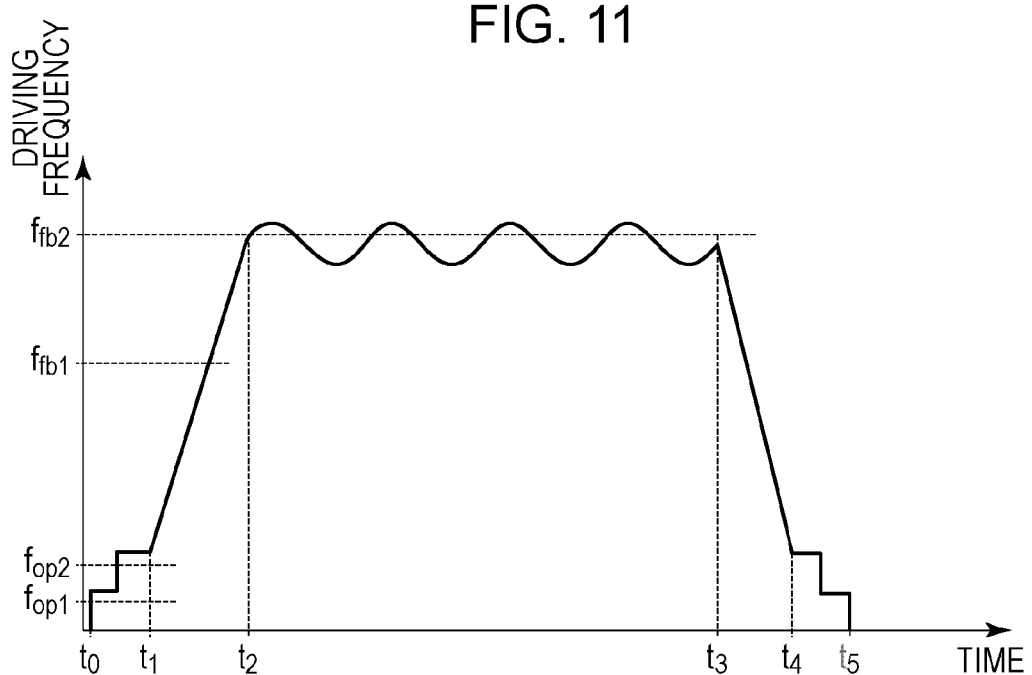
FIG. 11 is a diagram illustrating a time-dependent change in a driving frequency of a stepping motor according to the first embodiment.

FIG. 11 is a diagram illustrating timings of switching the microstep division ratio according to the present embodiment. In FIG. 11, a horizontal axis represents time, and a vertical axis represents a driving frequency. At time $t_0$, the driving operation is started in the open loop control mode, and the control mode is switched to the feedback control mode at a predetermined driving frequency at time $t_1$. At time $t_2$, the driving speed reaches a target value. At time $t_3$, it is started to reduce the driving speed. At time $t_4$, the control mode is switched from the feedback control mode to the open loop control mode. At time $t_5$, the driving operation is stopped. Note that frequencies (division ration switching frequencies) $f_{op1}$ and $f_{op2}$ on the vertical axis at which the microstep division ratio is switched in the open loop control mode, and division ratio switching frequencies $f_{fb1}$ and $f_{fb2}$ in the feedback control mode corresponds to those illustrated in FIG. 8.

In the feedback control, fluctuations in the driving frequency are generated by a feedback signal even in a range $t_2$ to $t_3$ in which the driving is performed at a constant speed with a high driving frequency. In a case where the driving frequency fluctuates such that the driving frequency repeatedly goes up and down crossing the division ratio switch frequency $f_{fb2}$ as illustrated in FIG. 11, there is a possibility that the rotor 114 is not stably driven. To avoid the above situation, in a case where a division ratio switch frequency is equal to a frequency corresponding to a target driving speed, or in a case where the difference between the frequency at the target driving speed and the division ratio switching frequency is equal to or less than a predetermined value, the frequency at which the division ratio is switched may be changed.

In the present embodiment, the division ratio switch frequency $f_{fb2}$ is reset to a lower value (while maintaining $f_{fb2} > f_{fb1}$). In the present embodiment, the determination as to whether the division ratio switching frequency is reset or not is performed with reference to the target driving speed.

Figure 12:
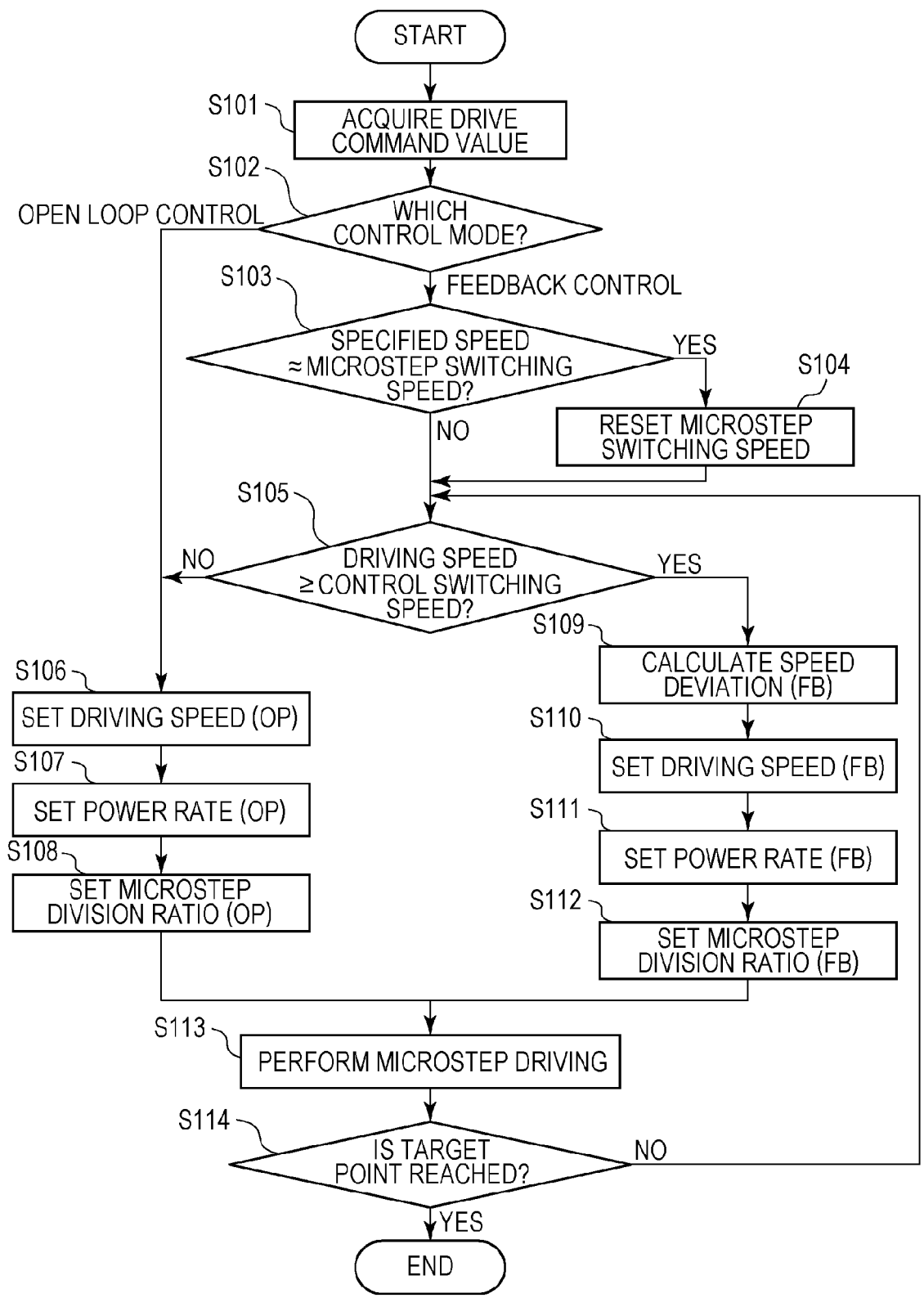
FIG. 12 is a flow chart illustrating details of a process of controlling a stepping motor performed by a drive control apparatus according to the first embodiment.

Next, the driving process performed by the drive control apparatus according to the present embodiment is described in further detail below with reference to a flow chart illustrated in FIG. 12. In step S101, the control unit 302 acquires drive command values. In the present embodiment, the drive command values acquired are information indicating a target driving amount, a target driving speed, a control mode, and a power rate. The drive amount is allowed to take a positive or negative value. When the drive amount is positive, the rotation is driven in a forward direction, while when the drive amount is negative, the rotation is driven in a backward direction. In step S102, the control unit 302 selects a control mode. According to a drive command value, the control unit 302 determines whether the driving is performed using the open loop control or the feedback control. In a case where it is determined that the open loop control is used, the processing flow proceeds to step S106. In a case where it is determined that the feedback control is used, the processing flow proceeds to step S103. In step S103, the control unit 302 determines whether resetting is to be performed as to a driving speed (division ratio switching speed) at which the microstep division ratio is switched. More specifically, the target driving speed specified in the drive command values is compared with the division ratio switching speed, and if the target driving speed is equal to or within a range close to a predetermined division ratio switching speed, then the division ratio switching speed is reset in step S104. Note that the range close to the division ratio switching speed is determined taking into account the fluctuation in the driving speed in the feedback control. In a case where the division ratio switching speed is not reset, the processing flow proceeds to step S105.

In step S105, the control unit 302 compares a driving speed calculated based on an output from the encoder 102 with a predetermined control mode switching speed. In a case where the driving speed is higher, the processing flow proceeds to step S109, and the control mode is switched to the feedback control mode. On the other hand, in a case where the driving speed is lower, the processing flow proceeds to step S106, and the control mode is switched to the open loop control mode. In the present embodiment, the driving operation is performed in the open loop control mode until the driving speed reaches a predetermined value. When the driving speed exceeds the predetermined value, the control mode is switched to the feedback control mode. The driving control mode is switched when the driving speed is at a predetermined threshold value, that is, the predetermined control mode switching frequency. In the present embodiment, the control mode switching speed is set to be equal to a maximum value of the driving speed allowed in the open loop control.

In a case where the open loop control is selected in step S102 or in a case where it is determined in step S105 that the driving speed is lower than the control mode switching speed, a process in step S106 and following steps is executed. In step S106, the driving speed is set, and in step S107 the power rate is set. The information on the target driving amount, the target driving speed, and the power rate is sent from the control unit 302 to the open loop control circuit 304. Based on the information on these parameters, the open loop control circuit 304 calculates the driving speed and the power rate and outputs them to the control unit 302. In step S108, the division ratio setting unit 305 determines the microstep division ratio based on the driving speed acquired in step S106. The information acquired via steps S106 to S108 is sent from the control unit 302 to the motor driver 306. In step S113, the motor driver 306 drives the stepping motor 101 using the microstep driving technique according to the received information.

In a case where it is determined in step S105 that the driving speed is equal to or higher than the control mode switching speed, the processing flow proceeds to step S109. In step S109, an output signal from the encoder 102 is processed by the detection value processing unit 301, and a result is fed back to the feedback control circuit 305. The feedback control circuit 305 calculates a speed deviation from the target driving speed sent from the control unit 302 and the actual driving speed of the stepping motor 101 calculated by the detection value processing unit 301. In steps S110 and S111, the feedback control circuit 305 calculates the driving speed and the power rate using the speed deviation and the information on the target driving amount, the target driving speed, and the power rate and the like sent from the control unit 302, and the feedback control circuit 305 outputs the calculated driving speed and power rate to the control unit 302. In step S112, the division ratio setting unit 303 determines the microstep division ratio. Note that the microstep division ratio may be set to a constant value or may be reduced as the frequency increases. In step S113, a driving signal is supplied to the motor driver 306 from the control unit 302, and the motor driver 306 drives the stepping motor 101 using the microstep driving technique according to the supplied driving signal. In step S114, the control unit 302 determines whether the target point has been reached with accuracy in units of microsteps. In a case where the target driving amount has been driven, the process is ended, but otherwise the processing flow returns to step S105 to repeat the process from step S105.

In the present embodiment, as illustrated in FIG. 8, the microstep division ratio is set discretely to values according to particular threshold values of frequency in both the open loop control mode and the feedback control mode. However, the present embodiment is not limited to this. For example, the range in which the driving is performed in the feedback control mode may be divided into a plurality of sub ranges, and the method of switching the microstep division ratio may be changed depending on the sub ranges.

For example, the sub ranges may be classified into sub ranges in which accelerating driving or a decelerating driving is performed and sub ranges in which constant-speed driving is performed. When accelerating driving or decelerating driving is performed, the microstep division ratio is set based on the driving speed output from the motor driver 306 and the rotational angular speed of the stepping motor 101 calculated by the detection value processing unit 301. When constant-speed driving is performed, the microstep division ratio is set to a constant value depending on the target driving speed. This allows it to properly set the microstep division ratio also in a low-speed driving range. Furthermore, it is possible to prevent the microstep division ratio from changing frequently when a driving frequency fluctuation occurs when constant-speed driving is performed in the feedback control mode.

Furthermore, in the present embodiment, when the driving operation is performed in the feedback control mode, driving speeds (division ratio switching speeds) at which the microstep division ratio is switched are reset according to the drive command value. However, the present embodiment is not limited to this. For example, driving speeds at which the division ratio is switched may be selectable, and the division ratio switching speed may be properly selected according to a drive command value.

Second Embodiment

Figure 13:
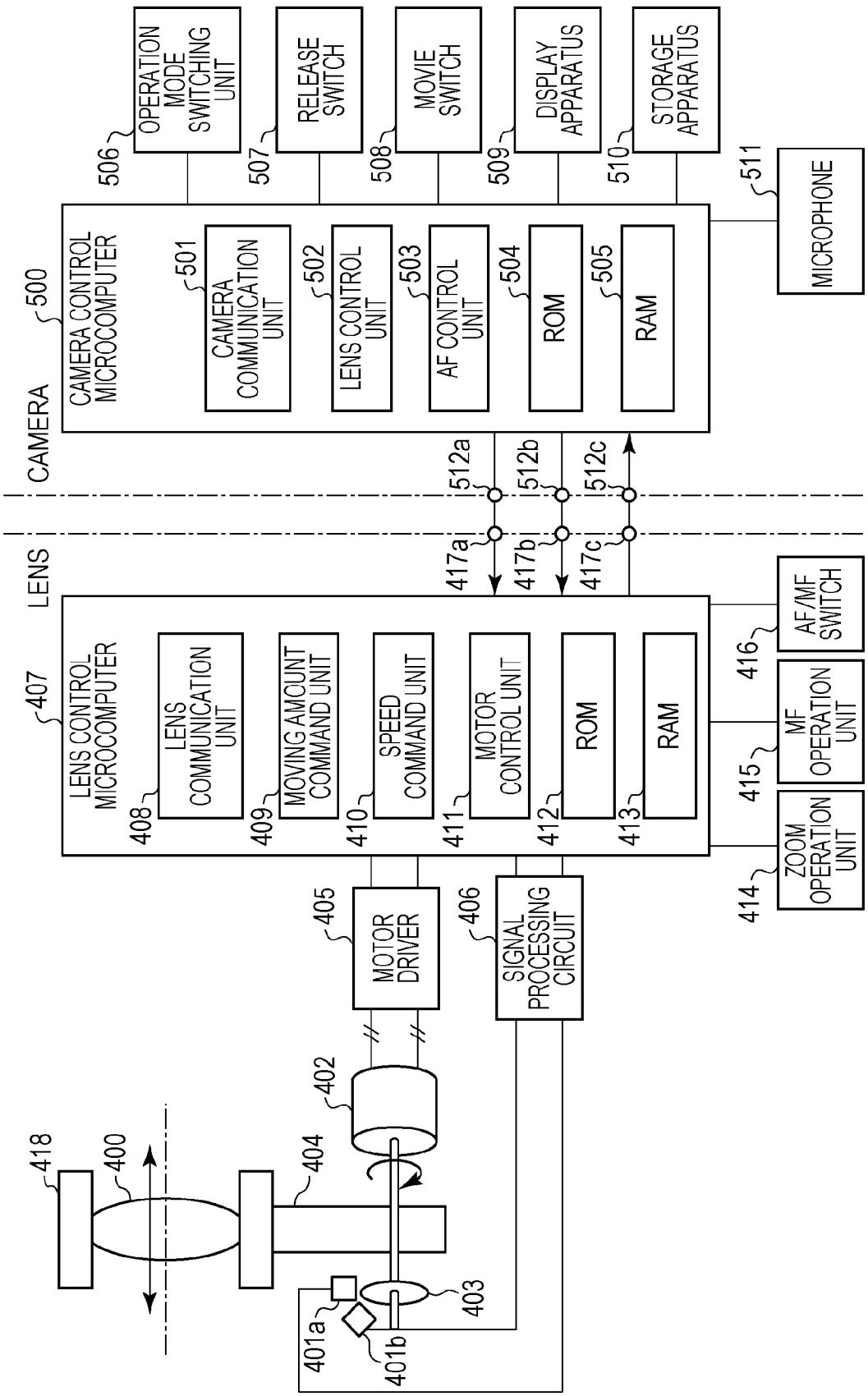
FIG. 13 is a block diagram illustrating a configuration of an image pickup apparatus including an interchangeable lens and a camera body according to a second embodiment.

FIG. 13 is a diagram illustrating a configuration of a single-lens reflex camera with an interchangeable lens, as an example of an image pickup apparatus according to a second embodiment. The image pickup apparatus may be a digital still camera, a digital video camera, a mirrorless camera, a microscope, or the like, and the lens may be installed integrally with a camera body.

A focus lens 400 is firmly held by a focus lens supporting unit 418 and is driven in a direction along an optical axis by a rotation of a stepping motor 402 via a transmission mechanism 404. The transmission mechanism 404 and an encoder magnet 403 are attached on a rotation shaft of the stepping motor 402. As the stepping motor 402 rotates, the magnetic field of the encoder magnet 403 changes, and the change is detected by magnetic sensors 401a and 401b. The means of detecting the rotation of the stepping motor 402 is not limited to magnetic sensors. For example, a combination of a circular plate with a slit and a photointerrupter may be used.

A motor driver 405 applies a driving current to an exciting coil of the stepping motor 402. A signal processing circuit 406 performs signal processing on detection signals supplied from the magnetic sensors 401a and 401b. The signal processing performed by the signal processing circuit 406 on the detection signals includes a signal amplification, level shifting, a digital-to-analog conversion, high-frequency signal removal for removing noise, and the like. Thereafter, a proper filtering process is performed on the detection signals, and the resultant detection signals are output to a lens control microcomputer 407. The lens control microcomputer 407 includes a lens communication unit 408, a moving amount command unit 409 configured to specify a moving amount of the focus lens 400, a speed command unit 410, a ROM 412 for storing a program and the like, and a RAM 413 for temporarily storing information. The lens control microcomputer 407 controls the motor driver 405 and the signal processing circuit 406.

The lens communication unit 408 receives information such as a drive command and the like from the camera communication unit 501 via contacts 417a, 417b, and 417c, and the lens communication unit 408 transmits information indicating a lens state or the like to the camera communication unit 501. The contacts 417a, 417b, and 417c are respectively for a clock signal line on the camera body, a data line from the camera body to the lens, and a data line from the lens to the camera body, and they are respectively connected to contacts 512a, 512b, and 512c on the camera body. The moving amount command unit 409 determines the moving distance of the focus lens 400 based on the drive command received via the lens communication unit 408, and the moving amount command unit 409 stores information on the moving distance in a RAM 413.

The motor control unit 411 generates an excitation pattern according to which to excite phases of the stepping motor 402 depending on a driving method such as 1-2 phase driving, microstep driving, or the like, and the motor control unit 411 outputs a result to the motor driver 405. Furthermore, the motor control unit 411 detects a rotation state of the stepping motor 402 from a signal received from the signal processing circuit 406, and calculates the driving speed of the stepping motor 402. A zoom operation unit 414 is operated by a user, and according to the amount of the operation performed by the user, an optical system, a mechanical system, and the like (not illustrated) related to zoom driving are driven depending on the amount of the operation performed by the user.

A MF operation unit 415 is operated by a user, and, in accordance with the amount of the operation performed by the user, the focus lens 400 is driven. An AF/MF switch 416 is a switch for use by a user to determine a focus mode by selecting either an AF (auto focus) mode or an MF (manual focus) mode. In a case where the AF mode is selected, the focus lens 400 is driven according to a focus command given from the camera body. On the other hand, in a case where the MF mode is selected, the focus lens 400 does not respond to the focus command from the camera body, but the focus lens 400 moves in response to an operation performed by a user on the MF operation unit 415.

In the camera body, there is a camera control microcomputer 500 that control the camera body. The camera control microcomputer 500 includes a camera communication unit 501, a lens controller 502, an AF control unit 503, a ROM 504, and a RAM 505. The camera communication unit 501 transmits information such as a drive command or the like from the camera body to the lens via the contacts 512a, 512b, and 512c, and receives information indicating the state of the lens. The contacts 512a, 512b, and 512c are respectively for the clock signal line on the camera body, the data line from the camera body to the lens, and the data line from the lens to the camera body.

The lens controller 502 generates a drive command to the lens. In the ROM 504, a program to be executed to perform various kinds of control is stored. In the RAM 505, information which is temporarily necessary is stored. A shooting mode switching unit 506 is operated by a user to select a focus mode and switch a shooting mode between a still image shooting mode and a moving image shoot mode. A release switch 507 is operated by a user. When the release switch 507 is pressed, an operation is performed to take a still image. The taken still image is stored in a recording apparatus 510. In a state in which the AF mode is selected by the shooting mode switching unit 506 and the AF switch is selected by the AF/MF switch 416, if the release switch 507 is half-pressed, the focus is adjusted automatically.

A record start switch 508 is operated by a user to perform an operation of taking a moving image. The taken moving image is stored in the storage apparatus 510. A display apparatus 509 is realized using a liquid crystal display or an organic EL display. The display apparatus 509 displays various kinds of information associated with shooting such as an F value, an ISO value, and the like and also displays a shot image. The recording apparatus 510 is a nonvolatile semiconductor memory for storing a captured still image or a captured moving image. The storage apparatus 510 may be a memory installed in the camera, or may be a flash memory card such as a SD card, a CD card, or the like. A microphone 511 detects a sound/voice during the operation of taking a moving image, and the detected sound/voice is stored as audio data in the recording apparatus 510.

The motor control unit 411 includes the detection value processing unit 301, the control unit 302, the division ratio setting unit 303, the open loop control circuit 304, and the feedback control circuit 305, which are described in the first embodiment. According to a command from the motor control unit 411, optical elements such as focus lens 400 and the like are driven. The motor control unit 411 determines the microstep division ratio.

In the process of taking a moving image, if driving noise is generated when the focus lens 400 is driven, the driving noise is detected by the microphone 511 and recorded. An example of driving noise generated by the stepping motor 402 is noise generated by a vibration caused by an operation of intermittently driving the motor. In the present embodiment, because the rotor is driven by the microstep driving technique, the driving noise is suppressed. In a high-frequency range, if the microstep division ratio becomes too small, the influence of driving noise becomes significant. To avoid the above situation, the minimum value of the division ratio is determined in advance, and the motor control unit 411 performs the control such that the microstep division ratio does not become smaller than the predetermined minim value.

By setting the maximum driving speed of the stepping motor 402 so as to be equal to the driving speed at which the division ratio takes a minimum value, it is possible to minimize the driving noise of the focus lens 400 during the operation of shooting a moving image. In the feedback control mode, the microstep division ratio may be set to a constant value. Over a whole period in which the operation is performed in the feedback control mode, the division ratio is maintained at a value equal to that at the moment at which the control mode is switched from the open loop control to the feedback control.

By limiting the microstep division ratio during the operation of shooting a moving image as described above, it is possible to reduce the rotor driving noise and thus it is possible to achieve silence during the operation of shooting the moving image.

While the present invention has been described above with reference to exemplary embodiments, it is to be understood that the invention is not limited to the disclosed exemplary embodiments. Various modifications and changes are possible without departing from the spirit and the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125727, filed Jun. 14, 2013, which is hereby incorporated by reference herein in its entirety.

What is claimed is:

1. A drive control apparatus comprising:
a position detection unit configured to detect a rotational position of a rotor of a stepping motor;
a feedback drive unit configured to drive the stepping motor by a feedback control based on an output from the position detection unit;
an open loop drive unit configured to drive the stepping motor by an open loop control; and
a switching unit configured to switch the driving of the stepping motor between the driving of the stepping motor by the feedback control and the driving of the stepping motor by the open loop control,
wherein the switching unit is capable of switching the driving of the stepping motor between the driving of the stepping motor by the feedback control and the driving of the stepping motor by the open loop control,
wherein the feedback drive unit and the open loop drive unit are both configured to drive the stepping motor by microstep driving,
wherein the open loop drive unit controls the driving of the stepping motor such that as a driving frequency of the rotor increases, a microstep division ratio of the microstep driving decreases, and
wherein the feedback drive unit sets the division ratio of the microstep independently of the open loop drive unit.

2. The drive control apparatus according to claim 1, wherein the feedback drive unit drives the stepping motor such that in a case where the driving is switched to the driving by the feedback control, the feedback drive unit starts driving the stepping motor using the same microstep division ratio as that set by the open loop drive unit before the driving is switched to the driving by the feedback control.

3. The drive control apparatus according to claim 1, wherein in a case where the switching unit switches the driving of the stepping motor from the driving of the stepping motor by the open loop control to the driving of the stepping motor by the feedback control, the feedback drive unit does not change the microstep division ratio in the microstep driving.

4. The drive control apparatus according to claim 1, wherein the feedback drive unit discretely changes the microstep division ratio in the microstep driving with the rotor driving frequency.

5. The drive control apparatus according to claim 1, wherein the feedback drive unit reduces the microstep division ratio in the microstep driving as the rotor driving frequency increases,
and in a case where a difference between the driving frequency employed when the rotor is driven at a constant speed and a frequency at which the microstep division ratio in the microstep driving is switched is equal to or smaller than a predetermined value, the feedback drive unit changes the frequency at which the microstep division ratio is switched.

6. An image pickup apparatus comprising:
a stepping motor configured to drive an optical element;
a position detection unit configured to detect a rotational position of a rotor of the stepping motor;
a feedback drive unit configured to drive the stepping motor by a feedback control based on an output from the position detection unit;
an open loop drive unit configured to drive the stepping motor by an open loop control; and
a switching unit configured to switch the driving of the stepping motor between the driving of the stepping motor by the feedback control and the driving of the stepping motor by the open loop control,
wherein the switching unit is capable of switching between the driving of the stepping motor by the open loop control and the driving of the stepping motor by the feedback control,
wherein the feedback drive unit and the open loop drive unit are both configured to drive the stepping motor by microstep driving,
wherein the open loop drive unit controls the driving of the stepping motor such that as a driving frequency of the rotor increases, a microstep division ratio in the microstep driving decreases, and wherein the feedback drive unit sets the division ratio of the microstep independently of the open loop drive unit.

7. The image pickup apparatus according to claim 6, wherein the image pickup apparatus is capable of shooting a moving image, and wherein during an operation of shooting a moving image, the feedback drive unit does not change the microstep division ratio in the microstep driving.

8. The image pickup apparatus according to claim 6, wherein the image pickup apparatus is capable of shooting a moving image, and wherein during an operation of shooting a moving image, the feedback drive unit controls the microstep division ratio in the microstep driving so as not to be smaller than a predetermined value.

9. A method of controlling driving of a stepping motor by selecting either one of an open loop control and a feedback control, wherein the driving of the stepping motor is controlled by microstep driving in both the open loop control and the feedback control, wherein in the open loop control, the driving of the stepping motor is controlled such that the microstep division ratio in the microstep driving decreases as the driving frequency of the rotor of the stepping motor increases, and wherein in the feedback control the microstep division ratio is set independently of the open loop control.

* * * * *